(12) United States Patent
Yamato et al.

(10) Patent No.: US 6,562,161 B1
(45) Date of Patent: *May 13, 2003

(54) GAS GENERATING COMPOSITIONS FOR AIR BAG

(75) Inventors: Yo Yamato, Himeji (JP); Takeshi Takahori, Hyogo (JP); Masayuki Ueda, Yokohama (JP); Shingo Oda, Himeji (JP)

(73) Assignee: Daicel Chemical Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 63 days.

(21) Appl. No.: 08/848,600

(22) Filed: Apr. 29, 1997

(30) Foreign Application Priority Data

Mar. 24, 1997 (JP) .............................................. 9-069822

(51) Int. Cl.$^7$ ........................ C06B 31/00; C06B 45/10; B60R 21/28

(52) U.S. Cl. ........................ 149/45; 149/19.4; 280/741
(58) Field of Search .............................. 149/36, 45, 48, 149/109.2, 2, 19.4, 19.9; 280/241

(56) References Cited

U.S. PATENT DOCUMENTS

| | | | |
|---|---|---|---|
| 3,811,358 A | 5/1974 | Morse | |
| 3,827,715 A | 8/1974 | Lynch | |
| 3,829,537 A | 8/1974 | Rosenthal | |
| 3,958,949 A | 5/1976 | Plantif et al. | |
| 4,013,010 A | 3/1977 | Schneiter et al. | |
| 4,200,615 A | 4/1980 | Hamilton et al. | |
| 4,358,998 A | 11/1982 | Schneiter et al. | |
| 4,380,346 A | 4/1983 | Davis et al. | |
| 4,394,033 A | 7/1983 | Goetz et al. | |
| 4,713,127 A | 12/1987 | Müller et al. | |
| 4,876,962 A | 10/1989 | Olsson | |
| 4,886,293 A | 12/1989 | Weiler et al. | |
| 4,890,860 A | 1/1990 | Schneiter | |
| 4,911,077 A | 3/1990 | Johansson et al. | |
| 4,950,458 A | 8/1990 | Cunningham | |
| 4,998,751 A | 3/1991 | Paxton et al. | |

(List continued on next page.)

FOREIGN PATENT DOCUMENTS

| | | |
|---|---|---|
| DE | 3939258 A1 | 6/1991 |
| DE | 4019677 A1 | 1/1992 |
| DE | 4129541 A1 | 3/1992 |

(List continued on next page.)

*Primary Examiner*—Michael J. Carone
*Assistant Examiner*—Aileen B. Felton
(74) *Attorney, Agent, or Firm*—Birch, Stewart, Kolasch & Birch, LLP

(57) ABSTRACT

Gas generating pellets for an air bag system causes the initial inflating speed of the air bag to be increased at a reduced rate to prevent a passenger from being injured due to vigorous inflation of the air bag in the initial period, while maintaining sufficient ability to restrict the passenger after 35 to 50 milliseconds from the start of the inflation.

Combustion of the gas generating pellets for an air bag system are controlled such that in a tank test conducted with respect to a gas generator using the pellets, where a desired maximum tank pressure is P (kPa), and a period of time from the start of rising of the tank pressure to the time when the maximum tank pressure P (kPa) is reached is T milliseconds, the tank pressure measured after 0.25×T milliseconds is not higher than 0.20×P (kPa), and the tank pressure measured after 0.80×T milliseconds is not lower than 0.70×P (kPa). In particular, the gas generating pellets may be formed of a non-azide gas generating composition, and each pellet may be formed with a length of L (mm) and a hole having an inside diameter d(mm) of 0.2 to 1.5 (mm), such that the ratio L/d is 3.0 or larger.

28 Claims, 2 Drawing Sheets

U.S. PATENT DOCUMENTS

| | | |
|---|---|---|
| 5,104,466 A | 4/1992 | Allard et al. |
| 5,116,080 A | 5/1992 | Wipasuramonton |
| 5,125,684 A | 6/1992 | Cartwright .................. 280/736 |
| 5,145,535 A * | 9/1992 | Patrick ........................ 149/43 |
| 5,219,178 A | 6/1993 | Kobari et al. |
| 5,340,150 A | 8/1994 | Harada et al. |
| 5,345,875 A | 9/1994 | Anderson |
| 5,500,060 A | 3/1996 | Holt et al. |
| 5,545,272 A * | 8/1996 | Poole et al. ............... 149/78 X |
| 5,551,343 A * | 9/1996 | Hock et al. ............ 102/289 X |
| 5,551,725 A | 9/1996 | Ludwig |
| 5,553,889 A | 9/1996 | Hamilton et al. |
| 5,558,366 A | 9/1996 | Fogle, Jr. et al. |
| 5,584,503 A | 12/1996 | Lutz |
| 5,602,361 A | 2/1997 | Hamilton et al. |
| 5,616,883 A | 4/1997 | Hamilton et al. |
| 5,623,116 A | 4/1997 | Hamilton et al. |
| 5,627,337 A | 5/1997 | Hamilton et al. |
| 5,628,528 A | 5/1997 | DeSautelle et al. |
| 5,630,618 A | 5/1997 | Hamilton et al. |
| 5,641,938 A * | 6/1997 | Holland et al. ........... 149/60 X |
| 5,660,412 A | 8/1997 | Renfroe et al. |
| 5,675,102 A | 10/1997 | Hamilton et al. |
| 5,679,915 A | 10/1997 | Hamilton et al. |
| 5,682,013 A | 10/1997 | Smith et al. |
| 5,700,030 A | 12/1997 | Goetz |
| 5,711,546 A | 1/1998 | Hamilton et al. |
| 5,743,556 A | 4/1998 | Lindsey et al. |
| 5,756,929 A * | 5/1998 | Luivdstrom et al. ...... 149/36 X |
| 5,772,242 A | 6/1998 | Ueda et al. |
| 5,779,267 A | 7/1998 | Jordan et al. |
| 5,780,767 A * | 7/1998 | Matsuda et al. .......... 149/36 X |
| 5,780,768 A * | 7/1998 | Knowton et al. ............. 149/36 |
| 5,804,758 A * | 9/1998 | Marsaud et al. ........ 102/289 X |
| 5,817,972 A * | 10/1998 | Butt et al. ............... 149/109.2 |
| 5,821,448 A | 10/1998 | Hamilton et al. |
| 5,834,679 A * | 11/1998 | Seeger ..................... 149/24 X |
| 5,839,754 A | 11/1998 | Schlüter et al. |
| 5,850,053 A * | 12/1998 | Scheffee et al. .......... 149/36 X |
| 5,861,571 A * | 1/1999 | Scheffee et al. ........ 102/289 X |
| 5,868,424 A * | 2/1999 | Hamilton et al. ........... 280/741 |
| 5,938,236 A | 8/1999 | Tanaka et al. |
| 6,033,500 A | 3/2000 | Ito et al. |

FOREIGN PATENT DOCUMENTS

| | | |
|---|---|---|
| DE | 4234276 C1 | 11/1993 |
| DE | 4318883 A1 | 12/1993 |
| DE | 19520847 A1 | 12/1996 |
| DE | 19725452 A1 | 12/1998 |
| EP | 0012627 A | 6/1980 |
| EP | 0382552 A | 8/1990 |
| EP | 0404572 A2 | 12/1990 |
| EP | 0449506 A1 | 10/1991 |
| EP | 0586060 A2 | 3/1994 |
| EP | 0673809 A1 | 9/1995 |
| EP | 0742125 A | 11/1996 |
| EP | 0759383 A1 | 2/1997 |
| EP | 0776796 A2 | 6/1997 |
| EP | 0783997 A1 | 7/1997 |
| EP | 0800664 A2 | 10/1997 |
| EP | 0820971 A2 | 1/1998 |
| EP | 0867347 A2 | 9/1998 |
| GB | 2289029 A | 11/1995 |
| JP | 55-083639 A | 6/1980 |
| JP | 646156 B2 | 2/1989 |
| JP | 646157 B2 | 2/1989 |
| JP | 3208878 A | 9/1991 |
| JP | 4265292 A | 9/1992 |
| JP | 5254977 A | 10/1993 |
| JP | 6107109 A | 4/1994 |
| JP | 657629 B2 | 8/1994 |
| JP | 6239683 A | 8/1994 |
| JP | 761885 A | 3/1995 |
| JP | 7-251694 A | 10/1995 |
| JP | 840178 A | 2/1996 |
| JP | 8-156736 A | 6/1996 |
| JP | 8207696 A | 8/1996 |
| JP | 8-231290 A | 9/1996 |
| JP | 8-301061 A | 11/1996 |
| JP | 10-297418 A | 11/1998 |
| WO | 94014637 A1 | 7/1994 |
| WO | 96/10494 A | 4/1996 |
| WO | 96/30716 A | 10/1996 |
| WO | 96/40541 A | 12/1996 |
| WO | 97002160 A1 | 1/1997 |
| WO | 97/05087 A | 2/1997 |
| WO | 97041007 A1 | 11/1997 |

* cited by examiner

GAS GENERATING COMPOSITIONS FOR AIR BAG

FIELD OF THE INVENTION

The present invention relates to gas generating composition pellets adapted to supply gas components to inflate an air bag system, and also relates to a gas generating system for an air bag which uses the gas generating pellets. More specifically, the present invention is concerned with novel pellets formed of a gas generating composition, which are adapted to generate operating gases in an air bag system provided in an automobile, airplane or the like, for protecting passengers from impacts, and a gas generating system for an air bag which uses these gas generating pellets.

DESCRIPTION OF THE PRIOR ART

When a motor vehicle, such as an automobile, collides with something at a high speed, a passenger of the vehicle may crash into a hard structure, such as a steering wheel or windscreen, inside the vehicle, due to inertia. To prevent the passenger from being injured or killed in such a crash, an air bag system has been developed wherein an air bag is rapidly inflated by means of a gas, thereby preventing the passenger from colliding with the dangerous part of the vehicle. A gas generating agent used in this air bag system is required to satisfy very strict conditions. For example, the bag must be inflated in a considerably short period of time, normally within 40 to 50 milliseconds. Further, the atmosphere in the bag should be harmless to human bodies, namely, its composition should be close to that of the air inside the vehicle.

At present, the gas generating agent generally used in the air bag system contains, as a base, an inorganic azide compound, in particular, a sodium azide, for example. Although the sodium azide has excellent combustion characteristics, an alkaline component produced by this compound as a by-product upon generation of a gas shows toxicity, which means that this compound does not satisfy the above-described requirement for the safety of passengers. Since the sodium azide itself shows toxicity, there is a concern about an influence of this compound on environments when the air bag system is disposed of as a waste.

To overcome the above shortcomings, several kinds of non-azide gas generating agents, may replace those containing sodium azide, have been developed. For example, Japanese laid-open Patent Publication No. 3-208878 discloses compositions containing tetrazole, triazole, or metallic salts thereof, and an oxygen containing oxidizing agent, such as alkali metal nitrate, as major components. Japanese Patent Nos. 64-6156 and 64-6157 disclose gas generating agents containing metallic salts of bitetrazole compounds containing no hydrogen, as major components.

In addition, Japanese Patent No. 6-57629 discloses gas generating agents containing a transition metal complex of tetrazole or triazole. Japanese laid-open Patent Publication No. 5-254977 discloses a gas generating agent containing triaminoguanidine nitrate, and Japanese laid-open Patent Publication No. 6-239683 discloses a gas generating agent containing carbohydrazide, while Japanese laid-open Patent Publication No. 7-61885 discloses a gas generating agent containing a nitrogen containing non-metallic compound, such as cellulose acetate and nitroguanidine. Further, U.S. Pat. No. 5,125,684 discloses the use of nitroguanidine as an energy substance that coexists with 15–30° of a cellulose-based binder. Also, Japanese laid-open Patent Publication No. 4-265292 discloses a gas generating composition obtained by combining derivatives of tetrazole and triazole, oxidizing agent and a slag-forming agent.

With respect to gas generating behaviors and bag inflating behaviors in the conventional air bag systems as described above, it has been believed that the air bag system on the side of a driver seat (hereinafter abbreviated as a "D seat"), in particular, operates with sufficiently safe inflating behaviors, since the passenger in the driver seat is seated in a relatively fixed position. As air bag systems are being widely used, and becoming normally installed on recent vehicles, however, it has been desired to develop even safer air bag systems to deal with various situations, namely, those suitable for various types of drivers whose sitting heights vary from person to person, or who may drive while holding the steering wheel close to his/her body. The safer air bag systems have been also desired when a child is seated in a cabin seat, such as a passenger seat (hereinafter abbreviated as a "P seat").

Although the air bag systems having the conventional inflating behavior characteristics may be used, technologies for providing safer air bag systems have been desired which can reduce the rate of increase in the initial inflating speed, e.g., reducing the inflating speed of an air bag on the side of the D seat for a period of 10 milliseconds from the start of gas generation, to reduce the possibility of injuries due to rapid inflation of the air bag in the initial period, while maintaining sufficient passenger restricting capability after 30 to 50 milliseconds from the start of the gas generation. The similar technologies have been also desired to control gas generating behaviors on the side of the P seat.

Japanese laid-open Patent Publication No. 8-207696 discloses an example of such technologies in which the gas is generated in two steps such that the air bag is relatively slowly inflated in an initial operating stage and the gas is rapidly generated in the second stage. In this type of technology, however, the structure inside the gas generator becomes complicated, resulting in an increased size of its container, and increased manufacturing cost.

Thus, there has not yet been disclosed a technology to control the inflating speed of the air bag by controlling gas generating behavior only by gas generating composition pellets. It has been thus desired to develop a technology for controlling the gas generating behaviors by the gas generating composition pellets alone, with a simple structure and a low cost.

SUMMARY OF THE INVENTION

As a result of diligent studies in an attempt to solve the above problems, the inventors have reached the present invention based on a finding that the above problems may be solved by controlling the physical shape of the gas generating pellets into a suitably determined shape.

According to the present invention, there is provided gas generating composition pellets for an air bag system, characterized in that the pellets are controlled such that in a tank test conducted with respect to a gas generator using the pellets, where a desired maximum tank pressure is P (kPa), and a period of time from the start of rising of the tank pressure to the time when the maximum tank pressure P (kPa) is reached is T milliseconds, the tank pressure measured after $0.25 \times T$ milliseconds is not higher than $0.20 \times P$ (kPa), and the tank pressure measured after $0.80 \times T$ milliseconds is not lower than $0.70 \times P$ (kPa). In particular, the gas generating pellets may be formed of a non-azide gas generating composition and have holes, and each pellet may be formed with a length of L(mm) and a hole having an inside diameter d(mm) of 0.2 to 1.5 (mm), such that the value of L/d is 3.0 or larger.

The present invention also provides a gas generator for an air bag system, characterized in that in a tank combustion test conducted with respect to the gas generator using the above-described, pellets, where a desired maximum tank pressure is P (kPa), and a period of time from the start of rising of the tank pressure to the time when the maximum tank pressure P (kPa) is reached is T milliseconds, the tank pressure measured after 0.25×T milliseconds is not higher than 0.20×P (kPa), and the tank pressure measured after 0.80×T milliseconds is not lower than 0.70×P (kPa).

In the present invention, the tank test is conducted in the following manner. (Tank Combustion Test)

An inflator filled with gas generating pellets is fixed to the inside of a tank made of stainless steel and having a content volume of 60 liters. After the tank is air-tightly closed at room temperature, the inflator is connected to an external ignition circuit. By using a pressure transducer installed in the tank, pressure increases or changes in the tank are measured from time 0 to 200 milliseconds where the time 0 indicates a point of the time when the switch of the ignition circuit is turned on. Measurement data are processed by a computer, and finally represented as a tank pressure/time curve from which characteristics of the gas generating pellets can be evaluated. After the combustion, a portion of the gas in the tank is sampled out, to be analyzed in respect of its CO and NOx components, for example.

DETAILED DESCRIPTION OF THE PREFERRED EMBODIMENT

Figure 1:
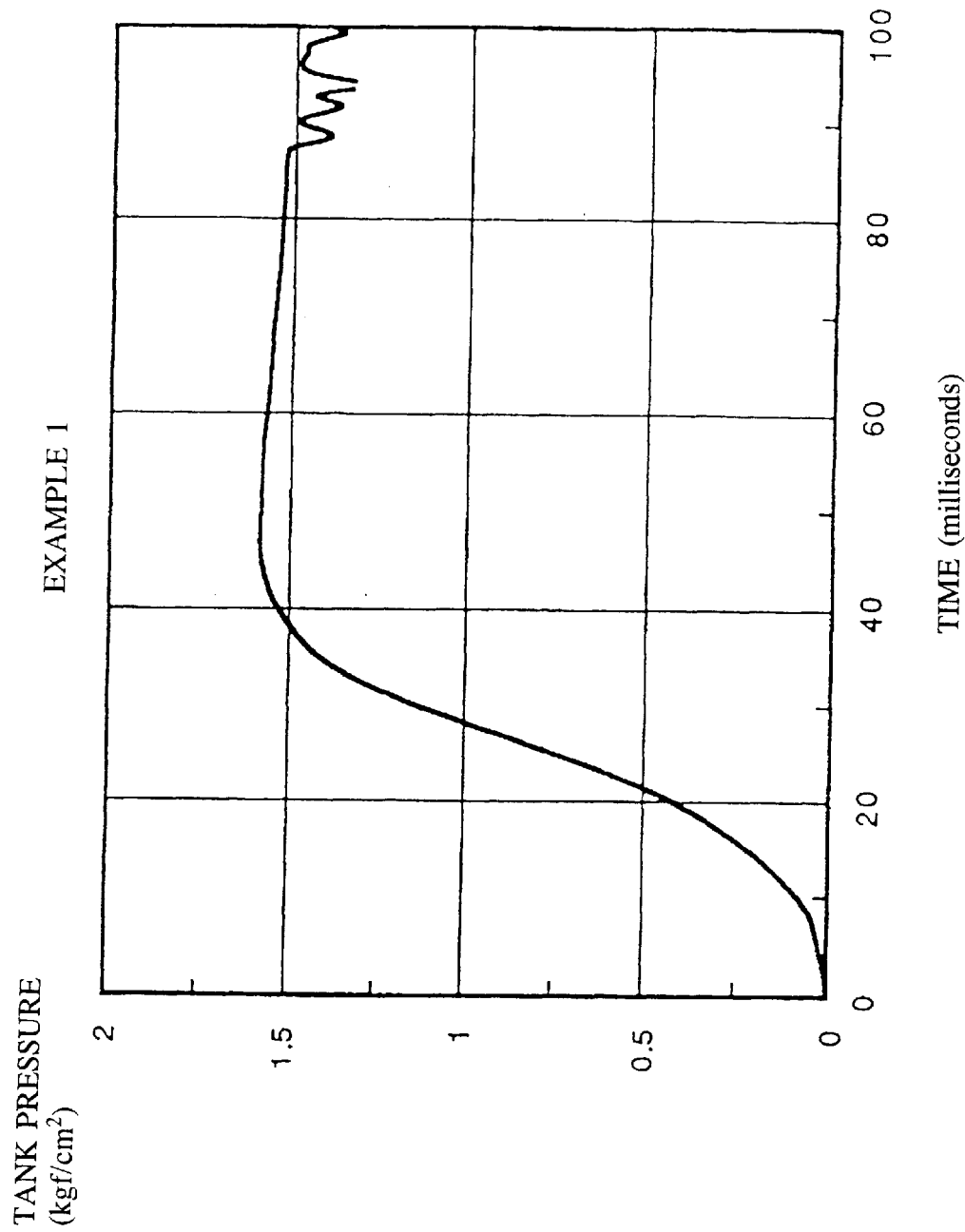
FIG. 1 is a pressure-time curve obtained in a tank test of Example 1.

A preferred embodiment of the present invention will be now described in detail.

The gas generating composition pellets for an air bag system of the present invention are characterized in that combustion of the pellets are controlled such that in a tank test conducted with respect to a gas generator using the pellets, where a desired maximum pressure of the tank is P (kPa), and a period of time from the start of rising of the tank pressure to the time when the maximum tank pressure P (kPa) is reached is T milliseconds, the tank pressure measured after 0.25×T milliseconds is not higher than 0.20×P (kPa), and the tank pressure measured after 0.80×T milliseconds is not lower than 0.70×P (kPa).

If the tank pressure measured after 0.25×T milliseconds exceeds 0.20×P (kPa), the air bag inflates too vigorously in the initial period, and may inflict an injury on the passenger. If the tank pressure measured after 0.80×T milliseconds is less than 0.70×P (kPa), the air bag system cannot ensure the safety of the passenger upon collision of the automobile or the like.

While the gas generating pellets of the present invention have the features as described above, one characteristic of their physical shape is that each pellet has a hole having the inside diameter d that is in the range of 0.2–1.5 (mm), and the value L/d is 3.0 or larger. The pellets having the holes are shaped in this manner to suitably control the proportion of the inner surface area that is initially ignited, relative to the entire inner surface area of the inner wall portion of each pellet, when the pellets are ignited or fired due to the thermal energy of the igniting system. The portion of the pellet that was not ignited in the initial period is brought into a burning condition immediately after this initial period, due to heat generated by the initially ignited portion. Thus, only the initial ignition stage can be controlled without increasing the time required to reach the maximum pressure. In this respect, the technology of the present invention is fundamentally different from a so-called power-diminishing technology (depowering technology) wherein the gas generating power as a whole is slightly reduced to control the ignition condition in the initial stage.

While the pellets with holes, according to the present invention, may be in a single-hole form, or may be formed in any shape provided that an aggregate of the pellets each having a small hole can achieve a desired result in controlling the ignition condition, the pellets are preferably in the single-hole form in view of the cost for forming the pellets. The inside diameter d of the hole is generally 0.2 to 1.5 mm, preferably, 0.4 to 1.0 mm. If the diameter d is less than 0.2 mm, an insufficient area of the inner surface of the pellet is initially ignited due to the thermal energy of the igniting system, and the desired result cannot be obtained. If the diameter d exceeds 1.5 mm, the thermal energy reaches the entire inner surface of the pellet, resulting in an increased combustion area in the initial ignition period, and the amount of the gas generated by the pellets cannot be desirably controlled.

The value L/d of each of the pellets with holes of the present invention is controlled to be 3.0 or larger. This value should be suitably determined depending upon the size of a container filled with the gas generating pellets, since a filling efficiency of the container reduces if the value L is too large. Thus, the value L/d is preferably controlled in the range of 3.0 to 10.0. If the value L/d is less than 3.0, the gas generating behaviors cannot be controlled as described above.

Although the length L of the pellet with the hole of the present invention is not particularly limited, it is preferably in the range of 1.5 to 30 mm. The outside diameter "D" is also not particularly limited, but it is preferably in the range of 2.4 to 5.0 mm.

There will be now described one preferred method for manufacturing the pellets with holes according to the present invention. Initially, a mass of gas generating composition is produced by a kneading operation using a solvent for dissolving a binder, depending upon the grain size and bulk density of the material. The solvent should be selected from those suitable for dissolving the binder and suitable for forming the material into a desired shape. Water may be used as a solvent for dissolving a water-soluble binder, and an organic solvent, such as ether, ethyl acetate, or acetone, may be used for dissolving a binder that is soluble in an organic matter. The amount of the solvent used is controlled to provide a concentration suitable for forming the desired composition, which is preferably in the range of about 10 to 30% by weight with respect to the final amount of the gas generating composition. The order of mixing ingredients is not particularly specified, but may be preferably determined so that the pellets can be manufactured with greatest safety. Then, after an excessive solvent is removed when appropriate, the mass of the composition is passed through a metallic mold having a given shape that provides a cylindrical shape having a single bore, and extruded normally under a pressure of 40 to 80 kg/cm$^2$, or in some cases, 130 to 140 kg/cm$^2$ to form a string-shaped cylindrical body with a single bore. Before the surface of the string-shaped cylindrical body dries, the cylindrical body is cut by a cutter into a plurality of pellets having a suitable length so that the value L/d of each pellet is 3.0 or larger, and these pellets are then dried.

The non-azide gas generating composition used in the present invention will be now described.

The non-azide gas generating composition used in the present invention is preferably comprised of a nitrogen containing compound, oxidizing agent, slag-forming agent and a binder.

The nitrogen containing compound used in the present invention may be selected from the group consisting of triazole derivatives, tetrazole derivatives, guanidine derivatives, azodicarbonamide derivatives and hydrazine derivatives, and mixtures of two or more of these compounds. Specific examples of the nitrogen containing compound may include 5-oxo-1, 2, 4-triazole, tetrazole, 5-aminotetrazole, 5, 5'-bi-1H-tetrazole, tetrazole, guanidine, nitroguanidine, cyanoguanidine, triaminoguanidine nitrate, guanidine nitrate, guanidine carbonate, biuret, azodicarbonamide, carbohydrazide, complex of carbohydrazide nitrate, oxalyldihydrazide oxalate, complex of hydrazine nitrate and others.

Of these nitrogen containing compounds, one kind or at least two kinds selected from the group consisting of tetrazole derivatives and guanidine derivatives is/are preferably used, and nitroguanidine, cyanoguanidine and 5-aminotetrazole are particularly preferably used. The nitroguanidine having the least number of carbons in one molecule is most preferably used. Although either of low-bulk-density nitroguanidine in the form of needle-like crystals, and high-bulk-density nitroguanidine in the form of lump-like crystals may be used as the nitroguanidine, the high-specific-density nitroguanidine is more preferably used in view of the safety and handling ease during manufacture of the pellets with a small amount of water.

The content of the nitrogen containing compound in the gas generating composition according to the present invention is preferably in the range of 25 to 56% by weight, more preferably, in the range of 30 to 40% by weight, though it varies depending upon the number of carbon elements, hydrogen elements and other oxidized elements in its molecular formula. Although the absolute value of the content of the nitrogen containing compound differs depending upon the type of the oxidizing agent in the gas generating composition, minor CO concentration in the generated gas increases as the absolute value is larger than the complete oxidation theoretical value, and minor NOx concentration in the generated gas increases as the absolute value is equal to or smaller than the complete oxidation theoretical value. Accordingly, the content of the nitrogen containing compound is most preferably controlled in the range in which these concentrations are optimally balanced.

While various compounds may be used as the oxidizing agent in the gas generating composition according to the present invention, the oxidizing agent is preferably selected from at least one kind of nitrates of alkali metal or alkali earth metal. Although other oxidizing agents other than nitrates, namely, nitrites and perchlorates that are often used in the field of air bag inflators, may be used, the nitrate is preferably used since the number of oxygen in one molecule of nitrite is smaller than that of nitrate, and the use of nitrate results in a reduced amount of mist produced and thrown out of the air bag. The nitrates of alkali metals or alkali earth metals may include sodium nitrate, potassium nitrate, magnesium nitrate, and strontium nitrate. In particular, strontium nitrate is preferably used.

Although the absolute value of the content of the oxidizing agent in the gas generating composition according to the present invention varies depending upon the kind and amount of the gas generating compound used, it is preferably in the range of 40 to 65% by weight, in particular, in the range of 45–60% by weight in view of the CO and NOx concentrations as described above.

The slag-forming agent in the gas generating composition according to the present invention functions to convert a liquid form of an oxide of alkali metal or alkali earth metal particularly produced by decomposition of the oxidizing agent in the gas generating composition, into a solid form to retain the oxide in the combustion chamber and thus prevent the oxide in the form of mist from being discharged out of the inflator. The optimum slag-forming agent may be selected to be suited for the metallic component to be converted into the solid form.

More specifically, the slag-forming agent may be formed of at least one kind selected from natural clays containing aluminosilicate as a major component, such as Japanese acid clay, silica, bentonite and kaolin, and artificial clays, such as synthetic mica, synthetic kaolinite, and synthetic smectite, and talc as one kind of minerals of water-containing magnesium silicate. Of these materials, Japanese acid clay and silica are preferably used, and Japanese acid clay is particularly preferably used.

For example, an oxide mixture having three-component-system of calcium oxide produced from calcium nitrate, and aluminum oxide and silicon dioxide as major components of the Japanese clay has a viscosity that varies from 3.1 poise to about 1000 poise in the range of 1350° C. to 1550° C., depending upon the ratio of these oxides in the composition, and a melting point that varies from 1350° C. to 1450° C. depending upon the composition. Utilizing these properties, the slag-forming agent exhibits its slag-forming capability that suits for the mixing ratio of the gas generating composition.

The content of the slag-forming agent in the gas generating composition according to the present invention may vary in the range of 1 to 20% by weight, preferably, in the range of 3 to 10% by weight. If the content of the slag-forming agent is too large, the linear burning rate is reduced, with a result of reduction in the gas volume. If the content is too small, the slag-forming agent cannot sufficiently fulfill its slag-forming function.

In the gas generating composition according to the present invention, the binder is an essential component for forming a desired shape of pellets. Any type of binder may be used provided that it shows a viscous property in the presence of water or a solvent, and the burning behaviors are not significantly affected by the binder. For example, the binder used in the present invention may be selected from polysaccharide derivatives, such as metallic salts of carboxymethyl cellulose, hydroxyethyl cellulose, cellulose acetate, cellulose propionate, cellulose acetate butyrate, nitrocellulose and starch. In particular, a water-soluble binder is preferably used in view of the safety and handling ease in the manufacture, and a metallic salt, in particular, sodium salt, of carboxynmethyl cellulose is most preferably used.

The content of the binder in the gas generating composition according to the present invention is preferably in the range of 3 to 12% by weight, more preferably, in the range of 4 to 12% by weight. As the amount of the binder increases, the break strength increases, but the number of carbon elements and hydrogen elements in the composition increases, with a result of an increase in the concentration of minor CO gas produced by incomplete combustion of the carbon elements, and the quality of the generated gas is undesirably lowered. If the content of the binder exceeds 12% by weight, in particular, the proportion of the oxidizing agent present relative to the binder needs to be also increased, and the proportion of the gas generating compound is reduced relative to the binder and oxidizing agent, thereby making it difficult to provide a practical gas generating system.

Where a sodium salt of carboxymethyl cellulose is used as the binder, it provides a secondary effect during the manufacture of pellets using water; namely, sodium nitrate produced by transmetallation between the sodium salt and the nitrate, which is present in a microscopically mixed condition, reduces the decomposition temperature of the nitrate as the oxidizing agent, in particular, strontium nitrate normally having a high decomposition temperature, thereby to improve the combustion characteristics.

As described above, the gas generating composition preferably used in the embodiment of the present invention is comprised of:
(a) about 25 to 56% by weight, preferably, 30 to 40% by weight of nitroguanidine;
(b) about 40 to 65% by weight, preferably, 45 to 65% by weight of oxidizing agent;
(c) about 1 to 20% by weight, preferably, 3 to 10% by weight of slag-forming agent; and
(d) about 3 to 12% by weight, preferably, 4 to 12% by weight of binder.

A more preferable composition is comprised of:
(a) about 30 to 40% by weight of nitroguanidine;
(b) about 40 to 65% by weight of strontium nitrate;
(c) about 3 to 10% by weight of Japanese acid clay or silica; and
(d) about 4 to 12% by weight of sodium salt of carboxymethyl cellulose.

The gas generating pellet of the present invention is preferably obtained by forming the composition comprising the following ingredients, into a cylindrical shape with a single hole:
(a) about 25 to 56% by weight of nitroguanidine;
(b) about 40 to 65% by weight of oxidizing agent;
(c) about 1 to 20% by weight of slag-forming agent; and
(d) about 3 to 12% by weight of binder.

A gas generator for an air bag system according to the present invention will be now described.

The gas generator of the present invention uses the pellets obtained as described above, and has the following characteristic; in a tank test conducted with respect to the gas generator, where a desired maximum pressure in the tank is P (kPa), and a period of time from the start of rising of the tank pressure to the time when the maximum tank pressure P (kPa) is reached is T milliseconds, the tank pressure measured after $0.25 \times T$ milliseconds is not higher than $0.20 \times P$ (kPa), and the tank pressure measured after $0.80 \times T$ milliseconds is not lower than $0.70 \times P$ (kPa).

While the structure of the gas generator of the present invention is not particularly limited, the gas generator preferably includes a housing having a plurality of gas discharge ports, igniting means provided within the housing, gas generating means ignited by the igniting means for generating a combustion gas, a combustion chamber that stores the gas generating means, and filter means for cooling the combustion gas and entrapping combustion residues. Preferably, the outer periphery of the filter means is opposed to the inner surface of the outer circumferential wall of the housing, with a space or clearance formed therebetween.

In the tank test conducted with respect to the gas generator for the air bag system on the side of the D (driver) seat according to the present invention, the maximum tank pressure P (kPa) is generally in the range of 110 to 220 (kPa), and the time T, namely, the period of time from the start of rising of the tank pressure to the time, when the maximum tank pressure P (kPa) is reached, is generally in the range of 30 to 50 milliseconds. The present invention is also applicable to the gas generator of the air bag system to be used for the P (passenger) seat. In this case, the maximum pressure P (kPa) may be 350–500 (kPa), and the time T from the start of rising of the tank pressure to the time when the maximum tank pressure P (kPa) is reached may be in the range of 50 to 70 milliseconds.

EXAMPLES

The present invention will be more specifically described, referring to some examples and a comparative example. It is, however, to be understood that the present invention is not limited to these examples.

Example 1

Water was added to 31 parts (hereinafter, "parts" means "parts by weight") of nitroguanidine, in an amount corresponding to 15 parts with respect to the whole amount of the composition, and they were mixed and kneaded together. Separately, 54 parts of strontium nitrate, 5 parts of Japanese acid clay, and 10 parts of sodium salt of carboxymethyl cellulose were dry mixed, and the above wet mixed powder was added to this mixture, and further kneaded. The thus kneaded mixture was passed through a metallic mold having an outside diameter of 3.2 mm$\phi$, and an inside diameter of 0.80 mm$\phi$, and extruded under a pressure of 80 kg/cm$^2$, to form a string-shaped, cylindrical body with a single bore. Then, this string-shaped body was cut into pellets each having a length of 4.0 mm, which were then sufficiently dried, to thus provide gas generating pellets.

With respect to a gas generator having 37 g of the thus obtained gas generating pellets, a tank test was conducted at room temperature, using a tank having a content volume of 60 liters.

The pressure-time curve obtained in the tank test is shown in FIG. 1, and numerical result of the evaluation with respect to L/d of gas generating pellet is summarized in TABLE 1.

As is apparent from the test result and FIG. 1, the tank pressure represented by the time-pressure curve increases gently or moderately in the initial period, and still reaches the maximum pressure within the desired time.

The interior of the tank was considerably clean, and the concentrations of slight amounts of gases, such as CO and NOx, were within the limits required by automobile manufacturers.

Examples 2, 3

Gas generating pellets were obtained in the same manner as in Example 1, except that the string-shaped body was cut by a cutter into different lengths as indicated in TABLE 1. The obtained gas generating pellets were evaluated in the same manner as in Example 1. The results of the evaluation are shown in TABLE 1.

Comparative Example 1

Gas generating pellets were obtained in the same manner as in Example 1, except that the string-shaped body was cut by a cutter into a length of 2.0 mm. The obtained gas generating pellets were evaluated in the same manner as in Example 1. The results of the evaluation are shown in TABLE 1.

Figure 2:
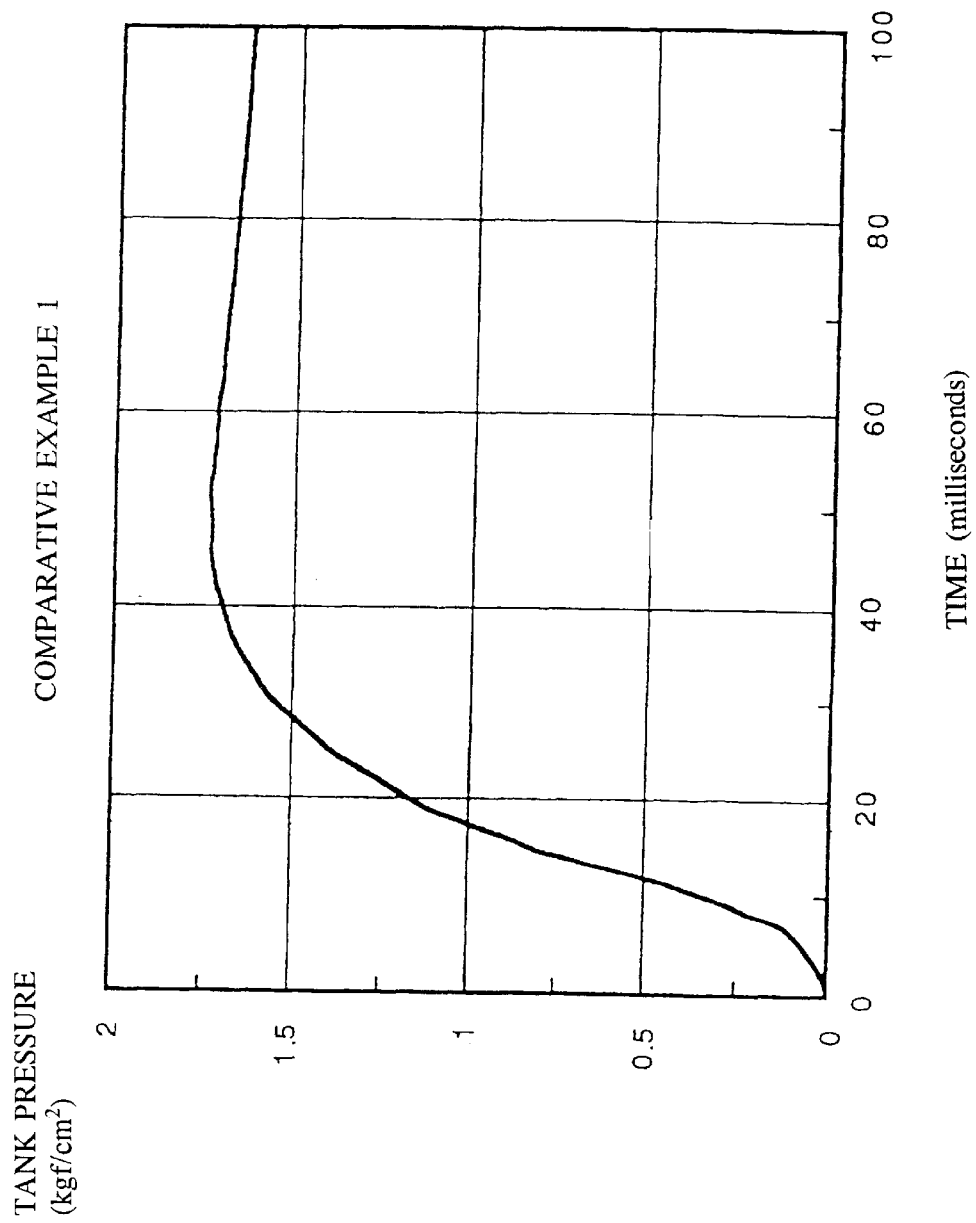
FIG. 2 is a pressure-time curve obtained in a tank test of Comparative Example 1.

The pressure-time curve obtained in the tank test is shown in FIG. 2.

As is apparent from the above test results and FIG. 2, it will be understood that the tank pressure represented by the curve in FIG. 2 exceeds a desired level when it increases in the initial ignition period, and the more rapid increase in the pressure compared to Example 1 results in a higher possibility that the passenger is injured by the air bag system having this gas generator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| | Length (L) of gas generating pellet (mm) | L/d | Time from ignition to rising of tank pressure (ms) | Time (T) from start of rising of pressure to reaching maximum tank pressure (ms) |
|---|---|---|---|---|
| Example 1 | 4.0 | 5.0 | 2.2 | 45.0 |
| Example 2 | 3.0 | 3.8 | 1.65 | 44.5 |
| Example 3 | 3.5 | 4.4 | 3.40 | 34.7 |
| Comparative Example 1 | 2.0 | 2.5 | 2.50 | 50.5 |

| | Maximum tank pressure (kpa) | Tank pressure after 0.25 × T milliseconds (kpa) | Tank pressure after 0.80 × T milliseconds (kPa) |
|---|---|---|---|
| Example 1 | 170 | 16.1 | 136.3 |
| Example 2 | 167 | 31.8 | 157.2 |
| Example 3 | 200 | 38.8 | 169.5 |
| Comparative Example 1 | 174.5 | 69.6 | 164 |

We claim:

1. A shape of a gas generating pellet used for an air bag gas generator, comprising:
    a main body having at least one hole provided therein, an inner diameter d of said at least one hole in a range of 0.2–1.5 mm, and a ratio L/d of a length L of said main body and said inner diameter d being 3 or greater to control an inner surface area of said hole that is initially ignited, relative to an entire inner surface area of said hole,
    wherein said gas generating pellet includes a non-azide gas generating composition, and
    wherein said non-azide gas generating composition includes
        (a) about 25–56% by weight of nitroguanidine,
        (b) about 40–65% by weight of an oxidizing agent,
        (c) about 1–20% by weight of a slag-forming agent, and
        (d) about 3–12% by weight of a binder.

2. The shape of a gas generating pellet according to claim 1, wherein said non-azide gas generating composition includes
    (a) about 30–40% by weight of nitroguanidine,
    (b) about 40–65% by weight of strontium nitrate,
    (c) about 3–10% by weight of acid clay or silica, and
    (d) about 4–12% by weight of sodium salt of carboxymethyl cellulose.

3. A gas generator for an air bag system, comprising:
    a housing having a combustion chamber and at least one diffuser port; and
    gas generating pellets provided in said housing for generating combustion gas, wherein each pellet includes,
        a main body having at least one hole provided therein, an inside diameter d of said at least one hole being in a range of 0.2–1.5 mm, and a ratio L/d of a length L of said main body and the inner diameter d being 3 or larger to control an inner surface area of said hole that is initially ignited, relative to an entire inner surface area of said hole, and prevent the airbag from applying excessive impact to a passenger upon inflation of the air bag,
        wherein said combustion chamber contains only said gas generating pellets.

4. The gas generator for an air bag system according to claim 3, wherein the gas generator includes
    igniting means provided within said housing and igniting said gas generating means to generate combustion gas, and
    filter means for cooling said combustion gas and entrapping combustion residues, an outer periphery of said filter means being opposed to an inner surface of an outer circumferential wall of said housing with a space formed therebetween.

5. The gas generator according to claim 3, wherein said main body has an elongated shape.

6. The gas generator according to claim 3, wherein said at least one hole is provided in said main body in a longitudinal direction of said main body.

7. The gas generator according to claim 3, wherein said ratio L/d is set between 3 and 10.

8. A method of attaining a reduced initial inflation speed of an air bag that is inflated by combustion gas generated from a gas generator, comprising:
    providing a combustion chamber inside the gas generator;
    providing gas generating pellets, each pellet provided with a hole having an inner diameter d of 0.2–1.5 mm, and a ratio L/d of a length L of the main body and the inner diameter d being 3 or greater to control an inner surface area of said hole that is initially ignited, relative to an entire inner surface area of said hole, and prevent the air bag from applying excessive impact to a passenger upon inflation of the air bag; and
    providing the combustion chamber only with said gas generating pellets; and
    igniting and combusting said gas generating pellets, such that in a 60 liter sealed tank combustion test, in which the gas generator containing said pellets is placed in a 60 liter tank and the gas generator generates a maximum tank pressure of P (kPa) at T milliseconds after an initial rise in the tank pressure due to combustion of said pellets, a pressure at 0.25×T milliseconds after initial rise in the tank pressure is not higher than 0.25×P (kPa), and a pressure at 0.8×T milliseconds after the initial rise is not lower than 0.70×P (kPa).

9. The gas generator for an air bag system according to claim 8, wherein the maximum tank pressure P (kPa) is in the range of 110 to 220 (kPa), and the time T is in the range of 30 to 50 milliseconds.

10. The method according to claim 8, wherein said main body has an elongated shape.

11. The method according to claim 8, wherein said at least one hole is provided in said main body in a longitudinal direction of said main body.

12. The method, according to claim 8, wherein said step for providing gas generating pellets includes the step of setting said ratio L/d between 3 and 10.

13. Gas generating pellets for an air bag system, comprising:
   a main body; and
   at least one hole provided in said main body,
   wherein in a 60 liter sealed tank combustion test, where a gas generator containing said pellets is placed in a 60 liter tank, and the gas generator generates a maximum tank pressure of P (kPa) at T milliseconds after an initial rise in the tank pressure due to combustion of said pellets, a pressure at 0.2×T milliseconds after initial rise in the tank pressure is not higher than 0.2×P (kPa), and a pressure at 0.80×T milliseconds after the initial rise is not lower than 0.70×P (kPa),
   wherein the pellets include a non-azide gas generating composition, said non-azide gas generating composition comprises
      (a) about 25–56% by weight of nitroguanidine,
      (b) about 40–65% by weight of an oxidizing agent,
      (c) about 1–20% by weight of a slag-forming agent, and
      (d) about 3–12% by weight of a binder, and
   wherein said non-azide gas generating composition comprises
      (a) about 30–40% by weight of nitroguanidine,
      (b) about 40–65% by weight of strontium nitrate,
      (c) about 3–10% by weight of acid clay or silica, and
      (d) about 4–12% by weight of sodium salt of carboxymethyl cellulose.

14. A gas generating pellet for an air bag gas generator, comprising:
   a main body having at least one hole provided therein, an inner diameter d of said at least one hole being in a range of 0.2–1.5 mm, and a ratio L/d of a length L of said main body and said inner diameter d being 3 or greater,
   wherein said main body includes,
      about 25–56% by weight of nitrogen containing compound, and
      about 40–65% by weight of an oxidizing agent including a metal element,
   wherein, in a 60 liter sealed tank combustion test, where the gas generator having a combustion chamber, in which only a plurality of main bodies are provided, is placed in a 60 litter tank, and the combustion of the main body generates a maximum tank pressure of P (pKa) to T milliseconds after detection of an initial rise in the tank pressure, a pressure at 0.25×T milliseconds after the detection of the initial rise in the tank pressure is not higher than 0.25×P (kPa), and a pressure at 0.80×T milliseconds after the detection of the initial rise is not lower than 0.70×P (kPa).

15. The gas generating pellet according to claim 14, wherein said main body has a length L of 1.5 to 30 mm, an outside diameter D of 2.4 to 5.0 mm, and said hole has an inside diameter d of 0.4 to 1.0 mm.

16. The gas generating pellet according to claim 14, wherein said main body further includes,
   about 1–20% by weight of a slag-forming agent, and
   about 3–12% by weight of a binder.

17. The gas generating pellet according to claim 14, wherein said at least one hole penetrates said main body.

18. The gas generating pellet according to claim 14, wherein said main body has an elongated cylindrical shape.

19. The gas generating pellet according to claim 14, wherein said at least one hole is provided in said main body in a longitudinal direction of said main body.

20. The gas generating pellet according to claim 14, wherein said ratio L/d is set between 3 and 10.

21. The gas generating pellet for an air bag gas generator, comprising:
   a main body having at least one hole provided therein, an inner diameter d of said at least one hole being in a range of 0.2–1.5 mm, and a ratio L/d of a length L of said main body and said inner diameter d being 3 or greater,
   wherein said main body includes,
      about 25–56% by weight of nitrogen containing compound, and
      about 40–65% by weight of an oxidizing agent including a metal element, wherein said main body includes
         about 30–40% by weight of nitroguanidine as said nitrogen containing compound,
         about 40–65% by weight of strontium nitrate as said oxidizing agent,
         about 3–10% by weight of acid clay or silica as a slag-forming agent, and
         about 4–12% by weight of sodium salt of carboxymethyl cellulose as a binder.

22. A gas generating pellet for an air bag gas generator, comprising:
   a main body having at least one hole provided therein, an inner diameter d of said at least one hole being in a range of 0.2–1.5 mm, and a ratio L/d of a length L of said main body and said inner diameter d being 3 or greater,
   wherein said main body includes nitrogen containing compound and an oxidizing agent including a metal element, and
   wherein, in a 60 liter sealed tank combustion test, where the gas generator having a combustion chamber, in which only a plurality of main bodies are provided, is placed in a 60 litter tank, and the combustion of the main body generates a maximum tank pressure of P (pKa) to T milliseconds after detection of an initial rise in the tank pressure, a pressure at 0.25×T milliseconds after the detection of the initial rise in the tank pressure is not higher than 0.25×P (kPa), and a pressure at 0.80×T milliseconds after the detection of the initial rise is not lower than 0.70×P (kPa).

23. The gas generating pellet according to claim 22, wherein said main body has a length L of 1.5 to 30 mm, an outside diameter D of 2.4 to 5.0 mm, and said hole has an inside diameter d of 0.4 to 1.0 mm.

24. The gas generating pellet according to claim 22, wherein said main body includes,
   a slag-forming agent and a binder.

25. The gas generating pellet according to claim 22, wherein said at least one hole penetrates said main body.

26. The gas generating pellet according to claim 22, wherein said main body has an elongated cylindrical shape.

27. The gas generating pellet according to claim 22, wherein said at least one hole is provided in said main body in a longitudinal direction of said main body.

28. The gas generating pellet according to claim 22, wherein said ratio L/d is set between 3 and 10.

* * * * *